US006849688B2

(12) United States Patent
Hellums

(10) Patent No.: US 6,849,688 B2
(45) Date of Patent: Feb. 1, 2005

(54) POLYMER GRAFTED SUPPORT POLYMERS

(75) Inventor: Mark Hellums, Austin, TX (US)

(73) Assignee: Sachem, Inc., Austin, TX (US)

(*) Notice: Subject to any disclaimer, the term of this patent is extended or adjusted under 35 U.S.C. 154(b) by 38 days.

(21) Appl. No.: 10/106,157

(22) Filed: Mar. 26, 2002

(65) Prior Publication Data

US 2003/0187142 A1 Oct. 2, 2003

(51) Int. Cl.$^7$ .................... C08F 255/02; C08L 51/06
(52) U.S. Cl. .............. 525/69; 525/70; 525/71; 525/190; 525/263; 524/504; 524/502
(58) Field of Search .................. 525/69, 70, 71, 525/190, 194, 263; 524/501, 502, 504

(56) References Cited

U.S. PATENT DOCUMENTS

| | | | |
|---|---|---|---|
| 3,839,172 A | | 10/1974 | Chapiro et al. |
| 4,012,303 A | | 3/1977 | D'Agostino et al. |
| 4,113,922 A | | 9/1978 | D'Agostino et al. |
| 4,230,549 A | | 10/1980 | D'Agostino et al. |
| 4,339,473 A | | 7/1982 | D'Agostino et al. |
| 4,414,090 A | | 11/1983 | D'Agostino et al. |
| 4,460,743 A | * | 7/1984 | Abe et al. ................ 525/68 |
| 4,468,441 A | | 8/1984 | D'Agostino et al. |
| 4,483,965 A | | 11/1984 | Ohba et al. |
| 4,605,685 A | | 8/1986 | Momose et al. |
| 4,713,416 A | * | 12/1987 | Del Giudice et al. ......... 525/92 |
| 4,990,558 A | * | 2/1991 | De Nicole, Jr. et al. .... 524/504 |
| 5,145,618 A | | 9/1992 | MacDonald et al. |
| 5,203,982 A | | 4/1993 | MacDonald |
| 5,468,390 A | | 11/1995 | Crivello et al. |
| 5,510,394 A | | 4/1996 | Hodgdon |
| 5,656,386 A | | 8/1997 | Scherer et al. |
| 5,948,826 A | | 9/1999 | Terada et al. |

FOREIGN PATENT DOCUMENTS

DE           1 937 960          7/1969

OTHER PUBLICATIONS

A.D. Dimov, et al., "Electrochemical Properties of Cation Exchange Membracnes,"J. Chem Soc., 1987, 83 (9), 2841–2845.

I. Alexandrova, et al., "Properties of Cation Exchange Membranes Obtained in the Presence of Diluents," Journial of Applied Polymer Science, vol. 41, 2555–2560 (1990).

Bhuvanesh Gupta, et al., "Development of Radiationgrafted FEP–g–Polystyrene Membranes: Some PropertyStructure Correlation," Polymers for Advanced Technologies, vol. 5, pp. 493–498 (1993).

A.D. Dimov, et al., "Preparation of ION–Exchange Membranes from Modified Polethylene With High Molecular Weight," Elsevier Science Publishers B.V., 46 (1983) 361–366.

B. Chakravorty, et al., "Studies on Synthesis of Ion–Exchange Membrane for Electrodialytic Treatment of Bleaching Plan Effluent," Interm J. Environmental Studies, 1986, vol. 27, pp. 173–181.

C. Heitner–Wirguin, "Recent advances in perfluorinated ionomer membranes: structure, properties and applications," Elsevier Science B.V., 1996.

G. Ungar, "Changes in Row Structure of Extruded Polyethylene Film on Grafting with Styrene. I. Distribution of Polystyrene and Crystalline Reorientation," Journal of Polymer Science, vol. 17, 2137–2149 (1979).

Bhuvanesh Gupta., "Proton Exchange Membranes by Radiation–Induced Graft Copolymerization of Styrene onto FA Copolymer Films. II. Characterization of Sulfonated Graft Copolymer Membranes," Journal of Applied Polymer Science vol. 54, 469–476 (1994).

Mohamed Mahmoud Nasef, "Cation Exchange Membranes by Radiation–Induced Graft Copolymerization of Styrene onto FA Copolymer Films. II. Characterization of Sulfonated Graft Copolymer Membranes," Journal of Applied Polymer Science vol. 76, 1–11 (2000).

Mohamed Mahmoud Nasef, et al., "XPS Studies of Radiation Grafted PTFE–g–polystyrene Sulfonic Acid Membranes," Jounral of Applied Polymer Science, vol. 76, 336–349 (2000).

Written Opinion dated Feb. 19, 2004, PCT/US03/09167.

* cited by examiner

Primary Examiner—James J. Seidleck
Assistant Examiner—Olga Asinovsky
(74) Attorney, Agent, or Firm—Vinson & Elkins, L.L.P.

(57) ABSTRACT

Novel polystyrene grafted polyolefin compositions having a high level of grafting are made using a novel process which involves suspending styrene in water. The polystyrene grafted polyolefin compositions can then be converted into ion exchange membranes that are particularly useful in electrolytic cells.

22 Claims, No Drawings

POLYMER GRAFTED SUPPORT POLYMERS

FIELD OF THE INVENTION

The present invention pertains to compositions comprising a polymer grafted to a support polymer such as a polyolefin, ion exchange membranes comprising said compositions, and processes for making said compositions and membranes. In particular, the invention involves compositions made via processes employing aqueous suspensions.

BACKGROUND AND SUMMARY OF THE INVENTION

Ion-exchange membranes are used in a variety of applications. One application of ion-exchange membranes is in electrochemical processes including electrosynthesis, electrodialysis, and electrolysis. The electrochemical processes perform a number of useful functions such as desalination of salt water, production of chlorine and sodium hydroxide from brine, and production of electricity in fuel cells.

Conventional ion-exchange membranes used in the aforementioned processes commonly comprise polystyrene linked to a polyolefin film. Unfortunately, the process for linking the polystyrene to the polyolefin for conventional ion-exchange membranes often employs a hazardous radiation source such as cobalt-60 gamma radiation.

Various processes have been tried to produce the polystyrene linked to polyolefin without employing radiation. In one such process a support polymer is swelled by soaking it directly in heated styrene or heated styrene with an organic solvent. The swollen support polymer is then polymerized in a heated brine bath with or without organic solvents. Unfortunately, the process generates excessive organic waste from solvents and homopolymerized styrene which must be washed from the product with rigorous washing. Another disadvantage is that the process does not result in a high amount of polystyrene linked to polyolefin.

For the aforementioned reasons, it would be desirable to discover a new process for preparing polystyrene or other polymers linked to a support polymer such as polyolefin. It would further be desirable if such a process resulted in a high amount of polymer linked to the polyolefin without radiation and without a large amount of organic waste from organic solvents or homopolymerized unlinked polymer. It would also be beneficial if the resulting compositions could be readily converted into a useful ion exchange membrane.

Advantageously, new processes have been discovered to make a polymer grafted to a support polymer. The processes result in a composition comprising a high amount of polymer grafted to a support polymer. The compositions can be readily converted to useful ion exchange membranes which reject ions surprisingly and unexpectedly better than conventional membranes. The process comprises (1) mixing an initiator with a monomer to be grafted to form a monomer-initiator mixture; (2) suspending the monomer-initiator mixture in water to form an aqueous suspension; and (3) contacting a support polymer with the aqueous suspension under conditions sufficient to polymerize the monomer and graft the polymer to the support polymer.

DETAILED DESCRIPTION OF THE INVENTION

Test Procedures and Definitions

Unless indicated otherwise, the following testing procedures are to be employed, each of which is incorporated herein by reference:

As used herein "graft" means that a polymer (which also may include residual monomer) is not readily separable from a support polymer, e.g., the polymer cannot be removed from the polyolefin by dissolution in toluene. Grafted polymer therefore includes polymer that is covalently bonded to the support polymer and polymer that is part of an interpenetrating matrix with the support polymer.

As used herein "support polymer" includes substituted or unsubstituted polyolefins, vinyl polymers, flouropolymers, and mixtures thereof.

As used herein "polymer grafted to a support polymer" includes polymers derived from hydrophobic vinyl monomers such as substituted or unsubstituted styrene, vinylbenzylchloride, divinylbenzene, butyl acrylate, and mixtures thereof.

The weight of the polymer grafted to the support polymer is normally described based on the percentage increase of the weight of the support polymer due to the grafted polymer. Therefore, the weight of the dry, ungrafted support polymer is determined prior to grafting and the total weight of the support polymer having the polymer grafted to it is determined after grafting. The percentage weight increase based on the ungrafted support polymer is reported as mass gain (%).

Using the techniques of the instant invention, the weight of the polymer grafted to the support polymer (mass gain) is generally at least about 5, preferably at least about 20, more preferably at least about 35, even more preferably at least about 40, and still more preferably at least about 45 weight percent of the ungrafted support polymer. The mass gain often varies depending upon the type of support polymer and hydrophobic monomer. For example, when the support polymer is polyethylene and the hydrophobic monomer is styrene, the mass gain is often at least about 30 weight percent or higher. In contrast, when the hydrophobic monomer is a mixture of vinylbenzylchloride and styrene, the mass gain may be only 20 weight percent or higher. Often when the support polymer is a flouropolymer, then the mass gains may be even lower. Thus, an advantage to the instant process is that one may vary the mass gain by varying the type of materials employed, as well as, the parameters of the process using the instant specification as a guide.

As used herein "composition" includes a mixture of the materials that comprise the composition, as well as, products formed by the reaction or the decomposition of the materials that comprise the composition.

As used herein "derived from" means made or mixed from the specified materials, but not necessarily composed of a simple mixture of those materials. Substances "derived from" specified materials may be simple mixtures of the original materials, and may also include the reaction products of those materials, or may even be wholly composed of reaction or decomposition products of the original materials.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 and the like, are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Processes

The processes of the instant invention typically comprise (1) mixing an initiator with a monomer to be grafted to form a monomer-initiator mixture; (2) suspending the monomer-initiator mixture in water to form an aqueous suspension; and (3) contacting a support polymer with the aqueous suspension under conditions sufficient to polymerize the monomer and graft the polymer to the support polymer. The polymerization of the monomer and grafting to the support polymer generally occur almost simultaneously but may occur in any order so long as the desired product results.

Monomer is Mixed with Initiator

The monomer to be grafted to the support polymer may be any compound or mixture of compounds that is capable of being polymerized and grafted. Generally, suitable monomers include those that have a vinyl group and are hydrophobic, i.e., immiscible with water. Preferably, suitable monomers are capable of undergoing free radical polymerization and are liquids at ambient temperatures. Preferable monomers include substituted or unsubstituted vinyl halides, acrylates and methacrylates, styrene, and styrene derivatives such as α-alkylstyrenes, and α-halostyrenes. Particularly preferable monomers include substituted or unsubstituted styrene, vinylbenzylchloride, divinylbenzene, and butyl acrylate. The monomers can be employed singly or in mixtures.

The monomer to be grafted is first mixed with an initiator (and a mixing aid or crosslinking agent if desired) to form a monomer-initiator mixture. The initiator employed is not critical so long as the initiator triggers appropriate polymerization of the monomer. The initiator is typically organic soluble and the initiator employed may vary depending upon the monomer, the support polymer, and the amount of grafting desired. Suitable initiators include azo initiators and organic peroxides such as azobisisobutyronitrile (AIBN), azobiscylohexancarbonitrile (Vaso88), benzoyl peroxide and others. An extensive list of free radical initiators is found Polymer Synthesis, Vol I, second edition, S. R. Sandler and W. Karo (1992), Academic Press which is incorporated herein by reference.

The amount of initiator to be mixed with the monomer varies depending upon the type of monomer, the initiator, the amount of aqueous suspension, and the desired amount of grafting. Typically, the amount of initiator is at least enough to trigger the desired amount of polymerization and not so much that excess initiator interferes with the desired grafting and final composition. Generally, the amount of initiator is at least about 0.01, preferably at least about 1.0, most preferably, at least about 3.0 percent by weight based on the weight of the monomer to be grafted. Correspondingly, the amount of initiator is less than about 20, preferably less than about 10, most preferably less than about 5.0 percent by weight based on the weight of the monomer to be grafted.

The temperature and type of mixer employed to form the monomer-initiator mixture is generally not critical. It is usually desirable to form a nearly homogeneous mixture. Likewise, it is usually desirable and convenient to conduct the mixing at a temperature below the initiation temperature of the initiator. Thus, it is generally preferable to mix the monomer and initiator at a temperature below about 45, preferably below about 35, preferably below about 30° C. In this manner, undesired homopolymerization of the monomer and corresponding ungrafted polymer is minimized or eliminated.

Monomer-Initiator is Suspended

Once the monomer-initiator mixture is formed, it is vigorously mixed with water to form an aqueous suspension. The amount of monomer-initiator mixture to be added to the water varies depending upon the relative amounts of monomer and initiator, the type of monomer and initiator, and the desired amount of grafting. Typically, the aqueous suspension has at least the amount of monomer-initiator mixture necessary to form grafted support polymer and does not have so much that undesirable organics such as homopolymerized monomer remain at the conclusion of the process. Typically, the amount of monomer-initiator mixture is at least about 0.5, preferably at least about 1.0, most preferably, at least about 2.0 percent by weight based on the total weight of the suspension.

While suspending agents may be employed in the water, the water preferably lacks substantial amounts of organic solvents (other than monomer and initiatior). Such solvents to be avoided include benzene, cyclohexane, nitrobenzene, toluene, low molecular weight alcohols, trichloroethylene, chloroform, dioxane, methyl acetate, diethyl ether, xylene, MEK, ethylene dichloride, THF, and the like. These organic solvents may cause excessive undesirable organic waste in the process or act to decrease the amount of grafting. By "lacking a substantial amount of organic solvent" it is generally meant that any solvent present other than monomer and initiator comprises less than about 9, preferably less than about 5, more preferably less than about 1, most preferably about 0 weight percent based on the weight of the polymerizable monomer in the system. It is also preferable that the aqueous suspension lacks a substantial amount of salt such as sodium or potassium sulfate or chloride salts. Such sodium or potassium salts may interfere with the subsequent polymerization step by acting to absorb heat and thus requiring excess energy for the polymerization. Such salts also may act to decrease the amount of grafting. By "lacking a substantial amount of salt" it is generally meant that the aqueous suspension comprises less than about 18, preferably less than about 10, more preferably less than about 1, even more preferably about 0 weight percent sodium or potassium salt.

While the temperature during the suspending step may vary, it is not critical. In order to speed up the reaction, it is often preferable to heat the reactor or reactor jacket. The temperature to which it is heated will generally vary depending upon the components and desired speed of reaction. Generally, heating the reactor jacket to at least about 50, preferably at least about 60, more preferably at least about 70° C. is desirable. Similarly, the pressure during the suspension, and during the entire process for that matter, is not critical. Therefore, while subatmospheric or superatmospheric conditions may be employed, it is preferable and convenient to employ atmospheric pressure.

Polymerization and Grafting

The aforementioned aqueous suspension is contacted with a support polymer such as polyolefin under conditions sufficient to polymerize the monomer and graft the polymer to the support polymer. The contacting may be employed in any manner so long as the suspension and support polymer become associated in a manner such that the desired polymer grafted support polymer results. Thus, the support polymer may, for example, be immersed, soaked, sprayed, coated, or dipped in the suspension. Likewise, the support polymer may be created in situ in the suspension. Preferably the support polymer is immersed in the suspension.

The support polymer employed may be of any size, shape, or form. However, if a membrane is to be made after grafting then the support polymer is preferably in the form of a film. The thickness of the film will vary depending upon the type of support polymer and the desired thickness of the membrane to be made. Generally, the thickness of the film is at least thick enough so that it will withstand the contact of the suspension without breaking and not so thick that it cannot be grafted almost homogeneously throughout the thickness.

Therefore, it has been found for many membrane applications the thickness is at least about 0.02, preferably at least about 0.05, most preferably at least about 0.075 millimeters. Correspondingly, for many membrane applications the thickness is less than about 0.20, preferably less than about 0.15, most preferably less than about 0.10 millimeters.

The support polymer may be any thermoplastic polymer but preferably comprises ethylene, an α-olefin having from about 3 to about 6 carbon atoms, or a vinyl polymer. Particularly preferred polyolefins are selected from the group consisting of polyethylene, polypropylene, polybutylene, and copolymers and mixtures thereof. Particularly preferred types of polyethylene include low density polyethylene, linear low density polyethylene, ultra low density polyethylene, high density polyethylene, and ultra high molecular weight polyethylene.

Other support polymers that can be grafted include vinyl polymers such as fluoropolymers. Typical flouropolymers include polytetrafluoroethylene (PTFE or TEFLON), fluorinated ethylene propylene (FEP), perflouroalkoxy resin (PFA), Polytetrafluoroethylene-Perfluoromethylvinylether copolymer (MFA), polyvinylidene fluoride (PVDF), and ethylenetetrafluoroethylene copolymer (ETFE).

The conditions sufficient to polymerize the monomer and graft the polymer to the support polymer vary depending upon the type and amount of initiator, monomer, and polyolefin employed, as well as, the amount of grafting desired. Generally, the conditions include a temperature above room temperature at atmospheric pressure. Typically, a temperature above the initiation temperature and below the degradation temperature of the materials is employed. This may range from at least about 40, preferably at least about 55, to at most about 100, preferably less than about 90° C. Typically, the increased temperature is employed for at least about 8, preferably at least about 10 hours up to about 24 hours or more. Generally, the higher the temperature and the longer it is maintained, the higher the amount of grafting.

The increased temperature may be achieved via any suitable temperature increasing means. For example, the support polymer and/or the aqueous suspension may be heated via conduction or convection heating so long as the monomer is polymerized and grafted to the support polymer.

After the formation of the polymer grafted to the support polymer, any remaining ungrafted aqueous suspension in contact with the grafted support polymer is separated. It may be separated by any means physical or chemical, however, physical separation is adequate and convenient in most cases. For example, if the support polymer was immersed in the suspension, then the grafted support polymer may be simply removed from the suspension.

If necessary, the surface of the support polymer is cleaned of any unwanted material such as ungrafted homopolmer, e.g. polystyrene homopolymer. The cleaning can be readily accomplished by dissolving the unwanted material in a suitable solvent, for example, toluene. This may be accomplished by immersing the grafted support polymer article in a solvent such as toluene from about 1 to about 5 minutes. Alternatively, the article can be wiped with a towel or cloth that is wetted with a suitable solvent and the polystyrene is readily removed from the surface.

The resulting grafted support polymers have surprising and unexpectedly high amounts of grafted polymer. In addition, the process results in low amounts of organic waste in the aqueous suspension since a high percentage of the monomer employed in the aqueous suspension becomes grafted as opposed to wasted ungrafted homopolymer. Typically, the monomer yield is from about 20 to about 50% depending on the monomer. Any unused monomer that has not been homopolymerized may simply be used again. Any monomer which is not incorporated into the grafted film turns into polystyrene homopolymer particles which can be easily separated as discarded. Since little or no organic solvent is employed, there is little organic waste.

If an ion exchange membrane is desired then the grafted polyolefin can be functionalized by standard methods. Thus, if a cation exchange membrane is desired, then the polymer is substituted with one or more acidic groups capable of exchanging cations such as sulfonate, carboxylate, phosphonate, iminodiacetic acid, and iminodiphosphonic acid. Particularly preferred cation exchange membranes can be made by sulfonating grafted polyethylene films wherein the grafts comprise polymers of styrene, styrene derivatives, or vinylbenzylchloride. Sulfonation can be by any convenient means such as employing chlorosulfonic acid in a solution of methylene chloride. Cation exchange membranes of this invention exhibit surprising and unexpected rejection of anions and are particularly useful in electrochemical processes.

If an anion exchange membrane is desired, then the polymer is substituted with one or more basic groups capable of exchanging anions such as substituted or unsubstituted amines and phosphines, alkylamine, dialkylamine, trialkylamine, alkylphosphine, dialkylphosphine, and trialkylphosphine. Particularly preferred anion exchange membranes can be made by using a solution of trimethylamine on grafted polyethylene films wherein the grafts comprise polymers of styrene, styrene derivatives, or vinylbenzylchloride. Anion exchange membranes of this invention exhibit surprising and unexpected rejection of cations and are particularly useful in electrochemical processes.

The following examples are not intended to limit the invention, but rather, are intended only to illustrate a few specific ways the instant invention may be employed.

EXAMPLE 1

An 8 cm by 8 cm square piece of ultrahigh molecular weight polyethylene film (UHMWPE) is dried in an oven at 90 degrees C. for 30 minutes. The thickness of the film sample is 0.075 mm and the dry mass is measured as 0.4613 grams. The film is placed in a 50 cc test tube suspended in a hot bath of silicone oil that is controlled at a temperature of 70 degrees C. The following is placed into a second test tube: 1.5 grams of commercial grade styrene monomer and 0.30 grams of azobisisobutyrolnitrile initiator powder. The test tube is shaken to allow the initiator to dissolve in the styrene. Then 30 grams of deionized water is poured into the test tube which is then sealed and shaken vigorously for 30 seconds. The resulting water/monomer suspension is poured into the test tube containing the film and sitting in the heating medium. The test tube is sealed to prevent the entry of oxygen. After 14.5 hours the test tube is removed from the hot bath, the reacted water/monomer suspension is poured out and the film is removed from the test tube. Excess homopolymer is wiped off with a paper towel wetted with toluene and then the grafted film is dried in an oven at 90 C. for 1.5 hours. The mass of the grafted film is measured after drying and is found to be 0.7281 grams. The fractional weight gain for the UHMWPE film from the incorporation of the grafted polystyrene is: $(0.7281-0.4613)/0.4613=0.578$ or 57.8 percent.

A series of 8 mm×8 mm polyolefin films were treated with the same procedure with variations as noted in the following table: The films used were: 0.075 mm thickness ultra high molecular weight polyethylene (UHMWPE), 0.050 mm polypropylene(Polypro), 0.05 mm polyvinylidene fluoride (PVDF), and 0.050 mm low density polyethylene (LDPE).

Examples 1–11

Grafting of polystyrene onto various polyolefin films with azobisisobutyronitrile initiator.

| Example no. | Film type | Temp (° C.) | Mass water (gram) | Mass styrene (gram) | Mass initiator (gram) | Reaction time (Hours) | Initial film mass (gram) | Mass gain (%) |
|---|---|---|---|---|---|---|---|---|
| 1 | UHMWPE | 70 | 30 | 1.5 | 0.30 | 14.5 | 0.461 | 58 |
| 2 | PTFE | 70 | 30 | 1.5 | 0.30 | 14.5 | 0.760 | 5.8 |
| 3 | UHMWPE | 70 | 30 | 1.5 | 0.15 | 14.5 | 0.457 | 55 |
| 4 | UHMWPE | 70 | 30 | 0.8 | 0.15 | 14.5 | 0.456 | 47 |
| 5 | UHMWPE | 70 | 40 | 2.0 | 0.20 | 10 | 0.478 | 70 |
| 6 | UHMWPE | 70 | 40 | 1.0 | 0.10 | 10 | 0.443 | 70 |
| 7 | UHMWPE | 70 | 40 | 1.0 | 0.03 | 10 | 0.452 | 45 |
| 8 | ETFE | 70 | 30 | 0.8 | 0.04 | 12 | 0.332 | 31 |
| 9 | Polypro | 70 | 40 | 1.1 | 0.06 | 14 | 0.256 | 44 |
| 10 | LDPE | 70 | 40 | 1.1 | 0.06 | 14 | 0.263 | 44 |
| 11 | PVDF | 70 | 40 | 1.1 | 0.06 | 14 | 0.815 | 10 |

Another series of films were treated with the same protocol, but the initiator and monomers were varied. The monomers used were vinylbenzylchloride (VBCl) and Styrene. The initiators used were azobisisobutyronitrile (AIBN), benzoyl peroxide (BP) and azobisylohexancarbonitrile (Vaso88). The films used were 0.10 mm thickness low density polyethylene (LDPE) and 0.075 mm UHMWPE.

| Example # | Film Type | Temp (° C.) | Film Initial Mass (g) | VBCl Mass (g) | Styrene Mass (g) | Initiator | Initiator Mass (g) | Time (hr) | Film Final Mass (g) | Film Mass Gain |
|---|---|---|---|---|---|---|---|---|---|---|
| 12 | LDPE | 90 | 0.4326 | 1.00 | 0.00 | AIBN | 0.05 | 12 | 0.5596 | 29.36% |
| 13 | LDPE | 90 | 0.4399 | 1.00 | 0.00 | BP | 0.05 | 12 | 0.5621 | 27.78% |
| 14 | LDPE | 90 | 0.4421 | 0.00 | 1.00 | AIBN | 0.10 | 12 | 0.5508 | 24.59% |
| 15 | LDPE | 90 | 0.4420 | 0.75 | 0.25 | AIBN | 0.10 | 12 | 0.5563 | 25.86% |
| 16 | LDPE | 90 | 0.4389 | 0.75 | 0.25 | AIBN | 0.05 | 12 | 0.5683 | 29.48% |
| 17 | LDPE | 90 | 0.4307 | 0.75 | 0.25 | BP | 0.10 | 12 | 0.5758 | 33.69% |
| 18 | LDPE | 80 | 0.4575 | 1.00 | 0.00 | BP | 0.10 | 12 | 0.5877 | 28.46% |
| 19 | LDPE | 80 | 0.4423 | 1.00 | 0.00 | BP | 0.05 | 12 | 0.5762 | 30.27% |
| 20 | LDPE | 80 | 0.4586 | 0.75 | 0.25 | AIBN | 0.10 | 12 | 0.5912 | 28.91% |
| 21 | LDPE | 80 | 0.4473 | 0.75 | 0.25 | AIBN | 0.05 | 12 | 0.5960 | 33.24% |
| 22 | LDPE | 80 | 0.4477 | 0.75 | 0.25 | BP | 0.10 | 12 | 0.6131 | 36.94% |
| 23 | LDPE | 80 | 0.4564 | 0.75 | 0.25 | BP | 0.05 | 12 | 0.6573 | 44.02% |
| 24 | LDPE | 80 | 0.4401 | 1.00 | 0.00 | BP | 0.05 | 12 | 0.5852 | 32.97% |
| 25 | LDPE | 80 | 0.3990 | 1.00 | 0.00 | Vazo88 | 0.10 | 12 | 0.4911 | 23.08% |
| 26 | LDPE | 80 | 0.4150 | 0.75 | 0.25 | AIBN | 0.05 | 12 | 0.5517 | 32.94% |
| 27 | LDPE | 80 | 0.4071 | 0.75 | 0.25 | BP | 0.05 | 12 | 0.5893 | 44.76% |
| 28 | LDPE | 80 | 0.4473 | 0.75 | 0.25 | Vazo88 | 0.05 | 12 | 0.6531 | 46.01% |
| 29 | LDPE | 80 | 0.4339 | 0.75 | 0.25 | Vazo88 | 0.10 | 12 | 0.6009 | 38.49% |
| 30 | LDPE | 90 | 0.4081 | 1.00 | 0.00 | Vazo88 | 0.10 | 12 | 0.5798 | 42.07% |
| 31 | LDPE | 90 | 0.4237 | 1.00 | 0.00 | Vazo88 | 0.05 | 12 | 0.6044 | 42.65% |
| 32 | LDPE | 85 | 0.4163 | 1.00 | 0.00 | Vazo88 | 0.10 | 12 | 0.5349 | 28.49% |
| 33 | LDPE | 85 | 0.4137 | 1.00 | 0.00 | Vazo88 | 0.05 | 12 | 0.5275 | 27.51% |
| 34 | LDPE | 85 | 0.4405 | 0.90 | 0.10 | Vazo88 | 0.10 | 12 | 0.6289 | 42.77% |
| 35 | LDPE | 85 | 0.4134 | 0.90 | 0.10 | Vazo88 | 0.05 | 12 | 0.5763 | 39.40% |
| 36 | LDPE | 85 | 0.4469 | 0.75 | 0.25 | Vazo88 | 0.10 | 12 | 0.6823 | 52.67% |
| 37 | LDPE | 85 | 0.4309 | 0.75 | 0.25 | Vazo88 | 0.05 | 12 | 0.6548 | 51.96% |
| 38 | LDPE | 70 | 0.4054 | 0.00 | 1.00 | AIBN | 0.10 | 12 | 0.5196 | 28.17% |
| 39 | LDPE | 70 | 0.4105 | 0.00 | 1.00 | Vazo88 | 0.06 | 12 | 0.6783 | 65.24% |
| 40 | LDPE | 70 | 0.4119 | 0.00 | 1.00 | Vazo88 | 0.10 | 12 | 0.7163 | 73.90% |
| 41 | UHMWPE | 70 | 0.3359 | 0.00 | 1.00 | AIBN | 0.06 | 12 | 0.4783 | 42.39% |
| 42 | UHMWPE | 70 | 0.3386 | 0.00 | 1.00 | AIBN | 0.10 | 12 | 0.4599 | 35.82% |
| 43 | UHMWPE | 70 | 0.3374 | 0.00 | 1.00 | Vazo88 | 0.06 | 12 | 0.5348 | 58.51% |
| 44 | UHMWPE | 70 | 0.3375 | 0.00 | 1.00 | Vazo88 | 0.10 | 12 | 0.4931 | 46.10% |
| 45 | LDPE | 70 | 0.4078 | 0.00 | 1.00 | Vazo88 | 0.06 | 18 | 0.6700 | 64.30% |
| 46 | UHMWPE | 70 | 0.3415 | 0.00 | 1.00 | Vazo88 | 0.06 | 18 | 0.4999 | 46.38% |
| 47 | LDPE | 70 | 0.4085 | 0.00 | 1.00 | Vazo88 | 0.06 | 18 | 0.6199 | 51.75% |
| 48 | UHMWPE | 70 | 0.3407 | 0.00 | 1.00 | Vazo88 | 0.06 | 18 | 0.4456 | 30.79% |
| 49 | LDPE | 80 | 0.4169 | 0.00 | 1.00 | Vazo88 | 0.06 | 18 | 0.7538 | 80.81% |
| 50 | LDPE | 80 | 0.4120 | 0.00 | 1.00 | Vazo88 | 0.06 | 18 | 0.7148 | 73.50% |
| 51 | LDPE | 75 | 0.4486 | 0.00 | 1.00 | Vazo88 | 0.06 | 18 | 0.7147 | 59.32% |
| 52 | LDPE | 75 | 0.4469 | 0.00 | 1.00 | Vazo88 | 0.06 | 18 | 0.6369 | 42.52% |

-continued

| Example # | Film Type | Temp (° C.) | Film Initial Mass (g) | VBCl Mass (g) | Styrene Mass (g) | Initiator | Initiator Mass (g) | Time (hr) | Film Final Mass (g) | Film Mass Gain |
|---|---|---|---|---|---|---|---|---|---|---|
| 53 | LDPE | 90 | 0.4363 | 0.00 | 1.00 | Vazo88 | 0.06 | 18 | 0.7360 | 68.69% |
| 54 | LDPE | 90 | 0.4116 | 0.00 | 1.00 | Vazo88 | 0.06 | 18 | 0.7018 | 70.51% |
| 55 | UHMW PE | 90 | 0.3398 | 0.00 | 1.00 | Vazo88 | 0.06 | 18 | 0.5272 | 55.15% |
| 56 | LDPE* | 75 | 0.6552 | 0.00 | 1.00 | Vazo88 | 0.06 | 18 | 0.8006 | 22.19% |
| 57 | LDPE* | 90 | 0.6605 | 0.00 | 1.00 | Vazo88 | 0.06 | 18 | 0.9404 | 42.38% |

*The film thickness for these runs was 0.15 mm.

Example 58

The grafted film from run 34 is placed in a solution of 40% aqueous timethylamine for 24 hours. An anion exchange membrane is formed by quaternization. The membrane is removed from the amine water and is rinsed in DI water. The mass of the water swollen membrane is 0.8487 g wet and then 0.6979 after drying. The percent gel water content is therefore: (0.8487−0.6979)/0.6979=21.6 percent. The ion exchange capacity of the new material is measured by dividing the chloride content of a sample as determined by titration with 0.1M silver nitrate by the dry mass of the sample. The result is 1.31 meq/g for the membrane. The ion exchange capacity of a commercially available anion exchange membrane, AMH from Tokuyama, is measured by the same method as 0.99 meq/g.

The membrane resistance is measured at room temperature by placing the membrane in a glass electrochemical cell equipped with platinum cathode and anode. The anolyte and catholyte solutions are 9 wt percent sodium chloride and the active area of the membrane and electrodes in the cell is 3.14 cm2. A DC current is passed through the cell so that chlorine is generated at the anode, hydrogen is generated at the cathode and chloride ions are passing through the membrane from the cathode to the anode side of the cell. The voltage between the electrodes is recorded as the current is varied. From this data the area resistance of the cell with the membrane in place is determined to be 33 Ohm-cm2. This is compared to the resistance of the cell with a commercial anion membrane, AMH from Tokuyama Corp., which is determined to be 40 Ohm-cm2 in the same apparatus under the same conditions.

Example No. 59
A Larger Scale Film Graft with Styrene and Rotation

A piece of LDPE film, 0.05 mm thick is cut with dimensions 22 inches×31 inches. The initial film mass is 19.8 grams. Copper wire is woven into the top and bottom edges of the film to stiffen it. This film is rolled up around a ½" diameter piece of stainless steel tubing into an approximately 1.8 inch outside diameter coil with the copper stiffening wires. The assembly of wire, tubing, and film is then placed into a 2" diameter by 32 inch tall jacketed stainless steel reactor. Hot water circulating at a set point temperature of 70° is pumped through the reactor jacket. A small flowrate of nitrogen gas is routed with tubing to sweep the top of the reactor. A monomer solution is prepared by dissolving 0.25 g of AIBN initiator in 25 g of styrene. This solution is then combined with 800 grams of deionized water in a 2 liter separator funnel. The separatory funnel is vigorously shaken by hand for 2 minutes. A suspension is formed and is poured into the stainless steel reactor. A second identical batch of monomer/water suspension is made and added to the stainless steel reactor which is now full and the film is completely covered in suspension. The reactor contents heat up and approach the 70° C. temperature of the hot water in the jacket. The grafting process begins and continues until the heating is stopped after 12 hours. The spent monomer suspension is drained from the reactor. The film is removed from the reactor, separated from the wire and tubing and washed with 120 g of toluene to remove polystyrene adhering to the surface of the film. The film is set out to dry in the air for 5 hours. The mass is 28.2 g. The weight gain from polystyrene incorporation is 43 percent.

The following examples are similar to example no. 59. In these examples the stainless steel tubing is rotated using a mechanical stirrer to increase agitation during the grafting reaction. Conditions were varied as shown in the table:

| Run # | Reactor Size (in) | Film Type | Initial Mass | Initial Horizontal Length (in) | Initial Ventical Length (in) | Styrene Mass (g) | Initiator | Initiator Mass | Stirrer RPM | Temp (° C.) | Time (hr) | Final Mass | Mass Gain (%) |
|---|---|---|---|---|---|---|---|---|---|---|---|---|---|
| 60 | 2 | LDPE | 38.62 | 28.50 | 23.25 | 47.6 + 2.4g DVB** | AIBN | 0.50 | 50 | 70 | 12 | 49.08 | 27.1 |
| 61 | 2 | LDPE | 38.30 | 28.50 | 23.25 | 50.0 | AIBN | 0.50 | 140 | 70 | 12 | 52.80 | 37.9 |
| 62 | 3 | UHMW PE | 33.32 | 31.00 | 24.00 | 150.0 | AIBN | 1.50 | 50 | 70 | 15 | 45.04 | 35.2 |
| 63 | 3 | UHMW PE | 39.04 | 36.00 | 24.25 | 150.0 | AIBN | 1.50 | 100 | 70 | 15 | 49.84 | 27.7 |

-continued

| Run # | Reactor Size (in) | Film Type | Initial Mass | Initial Horizontal Length (in) | Initial Vertical Length (in) | Styrene Mass (g) | Initiator | Initiator Mass | Stirrer RPM | Temp (° C.) | Time (hr) | Final Mass | Mass Gain (%) |
|---|---|---|---|---|---|---|---|---|---|---|---|---|---|
| 64 | 3 | UHMW PE | 22.80 | 24.25 | 20.87 | 150.0 | AIBN | 1.50 | 100 | 70 | 15 | 32.12 | 40.9 |
| 65 | 3 | UHMW PE | 31.66 | 29.00 | 24.25 | 137.5 | AIBN | 1.38 | 100 | 70 | 15 | 49.34 | 55.8 |
| 66 | 3 | UHMW PE | 32.56 | 30.00 | 24.25 | 137.5 | AIBN | 1.38 | 100 | 70 | 15 | 43.34 | 33.1 |
| 67 | 3 | UHMW PE | 32.76 | 30.00 | 24.25 | 137.5 | AIBN | 1.38 | 100 | 70 | 15 | 44.32 | 35.3 |
| 68 | 3 | UHMW PE | 33.24 | 30.50 | 24.25 | 137.5 | AIBN | 1.38 | 100 | 70 | 15 | 43.76 | 31.7 |
| 69 | 2 | UHMW PE | 34.32 | 31.32 | 24.25 | 50.0 | AIBN | 0.50 | 100 | 70 | 12 | 42.46 | 23.7 |
| 70 | 3 | UHMW PE | 33.68 | 31.00 | 24.25 | 137.5 | AIBN | 1.38 | 100 | 70 | 15 | 41.70 | 23.8 |
| 71 | 3 | UHMW PE | 32.66 | 31.00 | 23.25 | 137.5 | AIBN | 1.38 | 12 | 70 | 15 | 39.52 | 21.0 |
| 72 | 3 | LDPE | 41.60 | 30.87 | 23.62 | 137.5 | Vazo88 | 6.88 | 12 | 70 | 18 | 60.84 | 46.2 |
| 73 | 3 | LDPE | 41.82 | 31.00 | 23.75 | 110.0 | Vazo88 | 5.50 | 12 | 70 | 18 | 66.50 | 59.0 |
| 74 | 3 | LDPE | 42.90 | 30.87 | 23.62 | 88.0 | Vazo88 | 4.40 | 50 | 70 | 18 | 59.30 | 38.2 |
| 75 | 3 | LDPE | 44.14 | 33.00 | 23.75 | 88.0 | Vazo88 | 5.50 | 12 | 70 | 18 | 60.16 | 36.3 |
| 76 | 3 | LDPE | 45.22 | 33.00 | 23.75 | 88.0 | Vazo88 | 5.50 | 12 | 70 | 18 | 61.30 | 35.6 |
| 77 | 3 | LDPE | 40.40 | 31.00 | 23.62 | 66.0 | Vazo88 | 5.50 | 12 | 80 | 18 | 56.10 | 38.9 |
| 78 | 3 | UHMW PE | 32.88 | 31.00 | 23.62 | 66.0 | Vazo88 | 5.50 | 12 | 80 | 18 | 44.56 | 35.5 |
| 79 | 3 | UHMW PE | 32.78 | 31.00 | 23.62 | 66.0 | Vazo88 | 3.30 | 12 | 70 | 18 | 43.60 | 33.0 |

** DVB refers to divinylbenzene used as a crosslinking copolymer.

Example 80

A sulfonating solution of 2.5 weight percent chlorosulfonic acid in methylene chloride is prepared. A 15 cm×15 cm portion of the grafted film from example 64 weighing 1.82 grams is placed in a cylinder with 50 ml of the 2.5 weight percent chlorosulfonic acid solution for 2 hours. The film is removed from the sulfonating solution and is rinsed in DI water. The film is then hydrothermally treated by placing it in DI water, heated to 60 degrees C. for 3 hours. The film is removed from the water and the new dimensions are 17.2 cm×17.1 cm. The mass of the water swollen membrane is now 3.82 grams.

The membrane resistance is measured at room temperature by placing the membrane in a glass electrochemical cell equipped with platinum cathode and anode. The anolyte and catholyte solutions are 0.6 normal potassium chloride and the active area of the membrane and electrodes in the cell is 3.14 cm2. A DC current is passed through the cell so that chlorine is generated at the anode, hydrogen is generated at the cathode and potassium ions are passing through the membrane from the anode to the cathode side of the cell. The voltage between the electrodes is recorded as the current is varied. From this data the area resistance of the cell with the membrane in place is determined to be 59 Ohm-cm2. The resistance of the cell with an R1010 membrane, a low resistance commercial cation membrane produced by radiation grafting from Pall RAI, is determined to be 58 Ohm-cm2 in the same apparatus under the same conditions.

Examples 81–100

Following table show more examples of full scale membranes made with UHMWPE film (0.075 mm thick) with styrene as the monomer and Vaso88 as initiator. The grafted films were sulfonated with chlorosulfonic acid in methylene chloride and the dimensions after sulfonaton and hydrothermal treatment are shown. Selected ion exchange capacities (IEC) and gel water contents were measured and are also shown. For reference a commercial R1010 membrane was measured to have IEC=1.16 and gel water content of 59.7% by our methods.

Equations used in calculating % Gel Water Content, % Graft and IEC are:

$$\% \text{ Gel Water Content} = \frac{(\text{mass of film wet} - \text{mass of film dry})}{\text{Mass of film dry}} \times 100$$

$$\% \text{ Graft} = \frac{(\text{mass of film after graft} - \text{mass of film before graft})}{\text{Mass of film before graft}} \times 100$$

$$IEC[\text{meq}/g] = \frac{(\text{acid conc., N}) \times (\text{avg. of blk. titrant, mL} - \text{sample titrant, mL acid})}{\text{Mass of dry sample}}$$

The grafting was done in a 3 inch diameter stainless steel reactor with the film turned at 12 RPM, and the reactor jacket temperature controlled at 70° C. for 18 hrs.

| Example No. | Sample # | Initial film mass (g) | Initial film dimensions (in.) | Monomer mass (grams) | Initiator mass (grams) | Final graft mass (grams) | Dimensions after graft (in.) | % graft | Dimensions after Sulfonation, wet (in.) | IEC (meq/g) | Gel Water Content (wt. %) |
|---|---|---|---|---|---|---|---|---|---|---|---|
| 81 | 309 | 30.350 | 28 × 24¼ | 76 | 3.2 | 50.857 | 30 × 27½ | — | | | |
| 82 | 310 | 30.690 | 28 × 24¼ | 76 | 3.2 | 53.298 | 30⅜ × 27¾ | — | 37 ×32½ | | |
| 83 | 311 | 30.426 | 28 × 24¼ | 76 | 2.0 | 45.270 | 30¹⁄₁₆ × 27⅝ | 48.79 | 36½ × 32⅜ | | |
| 84 | 313 | 30.420 | 28 × 24¼ | 76 | 6.0 | 45.848 | 30 × 27¼ | 50.72 | 35½ × 32½ | | |
| 85 | 314 | 30.346 | 28 × 24½ | 76 | 6.0 | 46.878 | 30½ × 27¾ | 54.45 | 38 × 34½ | | |
| 86 | 315 | 30.170 | 28 × 24½ | 100 | 3.6 | 45.528 | 30¼ × 27¾ | 50.9 | 37½ × 34 | | |
| 87 | 316 | 30.250 | 28 × 24½ | 100 | 3.6 | 45.518 | 30¼ × 28 | 50.05 | | | |
| 88 | 317 | 30.429 | 28 × 24½ | 100 | 4.8 | 45.293 | 30½ × 27⅛ | 48.85 | | | |
| 89 | 318 | 30.198 | 28 × 24½ | 80 | 4.0 | 45.568 | 30¼ × 27¼ | 50.9 | 36¼ × 32⅝ | | |
| 90 | 319 | 30.323 | 28 × 24½ | 80 | 3.6 | 44.908 | 30 × 27⅛ | 48.1 | 35⅛ × 31¾ | | |
| 91 | 339 | 30.727 | 28 × 24½ | 80 | 4.0 | 41.427 | 29⅞ × 26⅜ | 34.8 | 34¼ × 30⅝ | | |
| 92 | 340 | 30.719 | 28 × 24½ | 68 | 4.5 | 46.855 | 30¼ × 27⅝ | 52.5 | 37½ × 35 | 2.5 | 103 |
| 93 | 341 | 31.471 | 29 × 24½ | 68 | 4.5 | 45.729 | 31 × 27¼ | 45.3 | 37¾ × 34¼ | 1.15 | 79.3 |
| 94 | 342 | 31.576 | 29 × 24½ | 64 | 4.3 | 44.712 | 27⅛ × 30¹⁵⁄₁₆ | 41.6 | 37⅜ × 34 | 1.11 | 68.4 |
| 95 | 347 | 31.533 | 29 × 24½ | 72 | 4.8 | 46.052 | 31⅛ × 27¼ | 46.04 | 38 × 34⅛ | 1.09 | 121 |
| 96 | 348 | 31.583 | 29 × 24½ | 68 | 4.5 | 46.595 | 27⅝ × 31⅛ | 47.5 | 38⅛ × 35 | | |
| 97 | 349 | 32.072 | 29 × 24½ | 68 | 4.5 | 46.037 | 31½ × 27½ | 43.5 | 37⅓ × 34½ | | |
| 98 | 350 | 29.950 | 29 × 23 | 68 | 4.5 | 50.677 | 32⅜ × 27⁹⁄₁₆ | 69.2 | | | |
| 99 | 352 | 30.062 | 29 × 23 | 68 | 4.5 | 42.978 | 30⅝ × 26 | 42.96 | | | |
| 100 | 358 | 30.426 | 29 × 23 | 68 | 4.5 | 46.595 | 31⅔ × 26⅝ | 53.14 | | | |

What is claimed is:

1. A composition comprising a polymer grafted to a polyolefin film by a non-radiated process which comprises contacting the polyolefin film with an aqueous suspension of a hydrophobic vinyl monomer and an initiator, wherein the polymer grafted to the polyolefin is made from the hydrophobic vinyl monomer and wherein the weight of the polymer grafted to the polyolefin film is at least about 20 weight percent of the ungrafted support polymer with the proviso that when the polymer grafted to the polyolefin consists of polystyrene grafted to polyethylene then the weight of the polystyrene grafted to the polyethylene is at least about 30 weight percent of the ungrafted polyethylene film.

2. The composition of claim 1 wherein the polymer grafted to the polyolefin is at least about 35 weight percent of the ungrafted polyolefin.

3. The composition of claim 1 wherein the polymer grafted to the polyolefin is at least about 40 weight percent of the ungrafted polyolefin.

4. The composition of claim 1 wherein the hydrophobic vinyl monomer is capable of undergoing free-radical polymerization and is a liquid at ambient temperature.

5. The composition of claim 1 wherein the hydrophobic vinyl monomer is selected from the group consisting of substituted or unsubstituted styrene, vinylbenzylchloride, divinylbenzene, butyl acrylate, and mixtures thereof.

6. The composition of claim 1 wherein the polyolefin comprises ethylene or an α-olefin having from about 3 to about 6 carbon atoms.

7. The composition of claim 1 wherein the polyolefin is selected from the group consisting of polyethylene, polypropylene, polybutylene, and copolymers and mixtures thereof.

8. The composition of claim 1 wherein the polyolefin is polyethylene.

9. The composition of claim 8 wherein the polyethylene is selected from the group consisting of low density polyethylene, linear low density polyethylene, ultra low density polyethylene, high density polyethylene, and ultra high molecular weight polyethylene.

10. The composition of claim 1 wherein the vinyl monomer is styrene and the polyolefin is polyethylene.

11. The composition of claim 10 which further comprises divinylbenzene.

12. The composition of claim 10 wherein the styrene grafted to the polyethylene is at least about 50 weight percent of the ungrafted polyethylene.

13. The composition of claim 1 wherein the vinyl monomer is vinylbenzylchloride and the polyolefin is polyethylene.

14. The composition of claim 1 wherein the polymer is substituted with one or more acidic groups capable of exchanging cations.

15. The composition of claim 14 wherein the acidic groups are selected from the group consisting of sulfonate, carboxylate, phosphonate, iminodiacetic acid, and iminodiphosphonic acid.

16. The composition of claim 1 wherein the vinyl monomer is styrene, the polyolefin is polyethylene, and the polymer is substituted with one or more acidic groups capable of exchanging cations.

17. The composition of claim 1 wherein the vinyl monomer is vinylbenzylchloride, the polyolefin is a polyethylene film, and the polymer is substituted with one or more acidic groups capable of exchanging cations to form a cation permeable membrane.

18. The composition of claim 1 wherein the polymer is substituted with one or more basic groups capable of exchanging anions.

19. The composition of claim 18 wherein the basic groups are selected from the group consisting of substituted or unsubstituted amines.

20. The composition of claim 19 wherein the basic groups are selected from the group consisting of alkylamine, dialkylamine, trialkylamine, quaternary amine, and mixtures thereof.

21. The composition of claim 1 wherein the vinyl monomer is vinylbenzylchloride, the polyolefin is polyethylene film, and the polymer is substituted with one or more basic groups capable of exchanging anions to form an anion permeable membrane.

22. A non-radiated process of making the composition of any one of claims 1–8 or 9–21 comprising contacting the polyolefin film with an aqueous suspension of a hydrophobic vinyl monomer and an initiator, wherein the polymer grafted to the polyolefin is made from the hydrophobic vinyl monomer and wherein the weight of the polymer grafted to the polyolefin film is at least about 20 weight percent of the ungrafted support polymer with the proviso that when the polymer grafted to the polyolefin consists of polystyrene grafted to polyethylene then the weight of the polystyrene grafted to the polyethylene is at least about 30 weight percent of the ungrafted polyethylene film.

* * * * *